United States Patent [19]

Nakamura et al.

[11] Patent Number: 5,476,619
[45] Date of Patent: Dec. 19, 1995

[54] PROCESS FOR MOLDING AN INTEGRAL SKIN FOAM USING AN EVACUATED MOLD CAVITY

[75] Inventors: Michihiko Nakamura; Masanao Ishikake; Yukio Kawakita; Akira Mabuchi; Osamu Yamanaka, all of Nakashima, Japan

[73] Assignee: Toyoda Gosei Co., Ltd., Aichi, Japan

[21] Appl. No.: 227,050

[22] Filed: Apr. 13, 1994

[30] Foreign Application Priority Data

Jun. 19, 1993 [JP] Japan ..................... 5-172145

[51] Int. Cl.⁶ .................................................. B29C 44/06
[52] U.S. Cl. ........................ 264/45.5; 264/50; 264/101
[58] Field of Search ...................... 264/45.5, 101, 264/50

[56] References Cited

U.S. PATENT DOCUMENTS

| | | |
|---|---|---|
| 3,824,199 | 7/1974 | Nadeau et al. . |
| 3,954,537 | 5/1976 | Alfter et al. . |
| 3,970,732 | 7/1976 | Slaats et al. . |
| 4,206,170 | 6/1980 | Sassman et al. . |
| 4,285,893 | 8/1981 | Contastin . |
| 4,510,106 | 4/1985 | Hirsch . |
| 4,517,313 | 5/1985 | Nakatani . |
| 4,555,087 | 11/1985 | Wallner et al. . |
| 4,572,865 | 2/1986 | Gluck et al. . |
| 4,576,970 | 3/1986 | Ganster et al. . |
| 4,579,700 | 4/1986 | Cavender . |
| 4,909,972 | 3/1990 | Britz . |
| 4,916,168 | 4/1990 | Pham et al. . |
| 4,988,271 | 1/1991 | Kumasaka et al. . |
| 5,100,926 | 3/1992 | Kondo et al. . |
| 5,116,183 | 5/1992 | Lee . |
| 5,132,329 | 7/1992 | Lynch et al. . |
| 5,166,183 | 11/1992 | Franyutti et al. . |

FOREIGN PATENT DOCUMENTS

| | | |
|---|---|---|
| 1407244 | 9/1975 | European Pat. Off. . |
| 6381 | 1/1980 | European Pat. Off. . |
| 44226 | 1/1982 | European Pat. Off. . |
| 211495 | 2/1987 | European Pat. Off. . |
| 451559 | 10/1991 | European Pat. Off. . |
| 4615222 | 12/1991 | European Pat. Off. . |
| 1575243 | 7/1969 | France . |
| 2634157 | 1/1990 | France . |
| 2212609 | 10/1973 | Germany . |
| 2366184 | 6/1979 | Germany . |
| 4115456 | 11/1992 | Germany . |
| 5-63238 | 5/1980 | Japan . |
| 55-63237 | 5/1980 | Japan . |
| 56-111648 | 9/1981 | Japan . |
| 62-164709 | 7/1987 | Japan . |
| 63-268624 | 11/1988 | Japan . |
| 64-5528 | 1/1989 | Japan . |
| 4226313 | 8/1992 | Japan . |
| 2092509 | 8/1982 | United Kingdom . |

*Primary Examiner*—Allan R. Kuhns
*Attorney, Agent, or Firm*—Cushman Darby & Cushman

[57] ABSTRACT

A process for molding a semi-rigid integral skin foam which comprising an integral skin having a low degree of foaming and a core having a high degree of foaming. The process includes evacuating a mold cavity to a pressure of from above 50 to 700 Torr; injecting, into the evacuated mold cavity, a polyurethane material which contains a polyol component and an isocyanate component with air bubbles introduced therein by air loading, in the substantial absence of a foaming agent; and foaming the material to fill the cavity.

3 Claims, 10 Drawing Sheets

PROCESS FOR MOLDING AN INTEGRAL SKIN FOAM USING AN EVACUATED MOLD CAVITY

BACKGROUND OF THE INVENTION

The present invention is further detailed in Japanese Patent Application No. 5-172145 filed Jun. 19, 1993, for which the present application claims priority and the entire content of which is incorporated herein by reference.

1. Field of the Invention

The present invention provides a process for molding a semi-rigid integral skin foam, wherein the semi-rigid integral skin foam comprises an integral skin region having a low degree of foaming and a core region having a high degree of foaming. The present invention is suitable for reaction injection molding (RIM) of a molded product having an integral skin foam, such as a cover or pad for a steering wheel of a motor vehicle, an instrument panel, a console box lid, a glove box lid, a headrest, an armrest, or an air spoiler.

2. Description of Related Art

A semi-rigid polyurethane foam containing an integral skin region having a low degree of foaming on its surface and a core region having a high degree of foaming at its center is generally referred to as an integral skin foam (ISF). It has been usual to mold an ISF by injecting, into a mold cavity, a polyurethane material of a polyol component and an isocyanate component and containing freon, and by vaporizing and expanding freon by the heat generated by a urethane-forming reaction.

At the center of the polyurethane material, the urethane-forming reaction and the vaporization of freon take place simultaneously, sustaining a myriad of freon bubbles. This results in the formation of a core having a high degree of foaming. The polyurethane material close to the wall surface of the mold cavity undergoes the urethane-forming reaction more slowly than that at the center, because the reaction heat dissipates through the wall surface of the mold cavity. One skilled in the art will appreciated that the slower the reaction is characterized by a lower reaction heat and, consequently, a reduced number of bubbles will be formed from a decreased vaporization of freon. The bubbles are compressed or collapsed by the internal foaming pressure. The result is the formation of an integral skin having a low degree of foaming.

The above-described conventional method for producing an ISF by the aid of freon poses the following problems: freon released to the atmosphere from any industrial or commercial process is recognized as a global problem and reductions in its use are being mandated by many countries;, formation of the integral skin by collapsing bubbles at the surface section by the internal foaming pressure allows minute bubbles to inevitably remain in the skin which ultimately impair the appearance of the final foamed product; and overpacking and subsequent discharge of the polyurethane material from a vent is necessary to increase the internal foaming pressure and to promote the mold filling. Ultimately this leads to a great loss of material.

Further, freon foamed processes which include a core in the mold cavity, such as is common in the production of steering wheels, suffer from turbulence induced defects such as pinholes, voids and shortshot, due to entrapped air. This is particularly a problem in the production of steering wheels, in which case a long ring core is placed in the mold cavity. Thus, it is necessary to select an adequate place for gating to minimize turbulence and to form several vents to release entrapped air.

We, the applicant of the present application, have previously filed a patent application covering an invention of a process for molding an ISF without using any freon. According to that invention, a polyurethane material containing substantially no foaming agent is injected into an evacuated mold cavity to be expanded (Japanese Patent Application No. 3-277285). It is desirable to evacuate the mold cavity to 50 Torr or below in order to form an integral skin which should have a firm feel. When the reduced pressure in the mold cavity (or its vacuum degree) exceeds 50 Torr, it has been difficult to mold any ISF including a core having a high degree of foaming and low density, since the polyurethane material contains substantially no foaming agent.

Alternative methods for producing polyurethane foams using reduced pressure are disclosed in the following Japanese Patents, however, these patents do not necessarily disclose or suggest the object, constitution and effect of the present invention.

Japanese Patent Laid-open Nos. 55-63237 and 55-63238 disclose a method for causing a polyurethane material to uniformly expand to fill a mold cavity completely, by evacuating the mold cavity through thin grooves formed in the walls of the mold cavity. However, these patents presumably teach the use of standard foaming agents as only conventional compositions are disclosed.

Japanese Patent Laid-open No. 56-111648 discloses a method for foaming a polyurethane material in an atmosphere of reduced pressure. The patentee claims that this method provides for a reduction in the amount of a foaming agent, such as freon, required. However, this method employs freon as conventionally used. This patent does not provide for the advantageous elimination of freon, as in the present invention.

Japanese Patent Laid-open No. 62-164709 discloses a method for producing a low-density polyurethane foam by expanding a polyurethane material which contains water as a foaming agent in an atmosphere of reduced pressure. Unlike the present invention, this method is not intended to produce an ISF. The formation of the skin is not desirable.

Japanese Patent Laid-open No. 63-268624 discloses a method for producing a polyurethane foam by causing a polyurethane material to capture nitrogen gas as much as 230 vol%, and expanding the material in an atmosphere of reduced pressure. This method is not taught to be useful to produce an ISF.

Japanese Patent Publication No. 64-5528 discloses a method for producing a polyurethane foam by injecting a rigid polyurethane material into an evacuated mold cavity at a packing ratio of about 150–450%, and subsequently expanding the material, however, the polyurethane material contains a foaming agent, such as freon.

SUMMARY OF THE INVENTION

As a result of our further research work, we, the inventors of the present invention, have succeeded in completing the present invention by finding that air loading makes it possible to mold easily an ISF including a core having a high degree of foaming and low density, even if substantially no foaming agent may be present in a polyurethane material, and even if a mold cavity may have a pressure exceeding 50 Torr.

It is an object of the present invention to provide a method for molding of an ISF including a core having a high degree of foaming and low density in the substantial absence, preferably in the complete absence of freon, and thereby provide a more ecologically advantageous process aimed at meeting more stringent regulatory standards.

It is another object to provide a method for the formation of a solid integral skin with a low degree of foaming whereby virtually no bubble remains, which provides a product with a surface appearance and feel which are as good as, or superior to those of a product made using freon as a foaming agent. One skilled in the art will appreciate that the method of the present invention provides a product with reduced defects such as pinholes, voids and short shot, thereby eliminating the common practice of overpacking polyurethane material which had previously led to an increased loss of material.

The present invention, therefore, provides an improved process for molding a semi-rigid ISF which contains an integral skin having a low degree of foaming and a core having a high degree of foaming. The improved process of the present invention includes evacuating a mold cavity to a pressure of from above 50 to 700 Torr; injecting, into the evacuated cavity, a polyurethane material of a polyol component and an isocyanate component, in the substantial absence of a foaming agent, and containing air bubbles introduced therein by air loading; and foaming the material.

The phrase "in the substantial absence of a foaming agent" means that the polyurethane material is not deliberately incorporated with any foaming agent, such as freon, methylene chloride, water and fine bubbles, for the purpose of foaming or foaming control. That is, the polyurethane material may contain slight amounts of various gases which are originally present therein, and slight amounts of water (normally in the range of 0.1 to 0.6 parts by weight for 100 parts by weight of the polyol component) absorbed inevitably therein. The phrase also means that the polyurethane material may contain a variety of foaming agents in such small amounts that they hardly affect the foaming control.

Air loading is usually performed to introduce air bubbles into the polyol component before it is mixed with the isocyanate component. The amount of air bubbles to be introduced into the polyurethane material depends on the foaming rate which is required of the core, and other factors known by one skilled in the art, however, the amount of air bubbles is usually 1 to 50% by volume.

According to the present invention, the polyurethane material injected into the mold cavity undergoes the following changes which vary from one portion to another in the cavity.

At the center which is away from the wall surface of the mold cavity, the polyurethane material sufficiently is foamed by the foaming and expanding actions of air bubbles, gases absorbed in the material and water, to form a core having a high degree of foaming and low density.

(1) Foaming by air bubbles and absorbed gases

The polyurethane material contains slight amounts of gases originally present therein and absorbed inevitably by it during its cycling. Air bubbles introduced into the polyurethane material by air loading expand under reduced pressure, and simultaneously the absorbed gases rapidly vaporize, foaming the material rapidly in a very short time. As a result, the polyurethane material flows through the mold cavity and fills it.

(2) Chemical foaming by the chemical reaction of water

The center of the polyurethane material gets hot (say, 70°–90° C.) due to the heat generated by the urethane-forming reaction between the polyol component and the isocyanate component. This reaction heat also promotes the reaction between the water inevitably absorbed in the polyurethane material and the isocyanate component, producing carbon dioxide gas which contributes to the foaming of the core.

(3) Physical foaming by boiling and evaporation of water

The mold cavity is evacuated and this results in the depression of the boiling point of water. However, the center of the polyurethane material remains at a high temperature, as described above. If the mold cavity is evacuated to a great extent or the temperature of the polyurethane material is raised intentionally, the temperature at the center of the material could be raised to be higher than the boiling point of water. In this case, water boils and evaporates to produce steam which contributes to the foaming of the core.

The foaming of the polyurethane material is restricted with the progress of the urethane-forming reaction, since its curing proceeds. A core of variable foaming rate can be produced by varying the degree of vacuum in the mold cavity or the amount of air bubbles to be introduced into the polyurethane material by air loading, within the ranges as defined above.

The polyurethane material close to the wall surface of the mold cavity does not get hotter than the mold temperature (usually 40°–60° C.), because the reaction heat from the polyol component and the isocyanate component dissipates through the wall surface of the mold cavity. This heat dissipation prevents the polyurethane material from becoming viscous, so that any bubbles such as air bubbles, gas bubbles, carbon dioxide gas and steam are easily debubbled. This results in the formation of a skin having a low degree of foaming, and its surface has almost invisible minute bubbles. The skin has, therefore, a surface appearance which is as good as, or superior to that of a product made employing freon as a foaming agent.

Since the mold cavity is evacuated, any defects such as pinholes, voids and short shot are less likely to occur. Therefore, it is possible to eliminate the necessity of overpacking the polyurethane material unlike when freon is used as a foaming agent, and thereby reduce the loss of material.

Further objects of this invention will become evident upon an understanding of the illustrative embodiments described below. Various advantages not referred to herein but within the scope of the instant invention will occur to one skilled in the art upon practice of the instantly disclosed invention. The following examples and embodiments are illustrative and not seen to limit the scope of the invention.

DETAILED DESCRIPTION OF THE PREFERRED EMBODIMENTS

Figure 1:
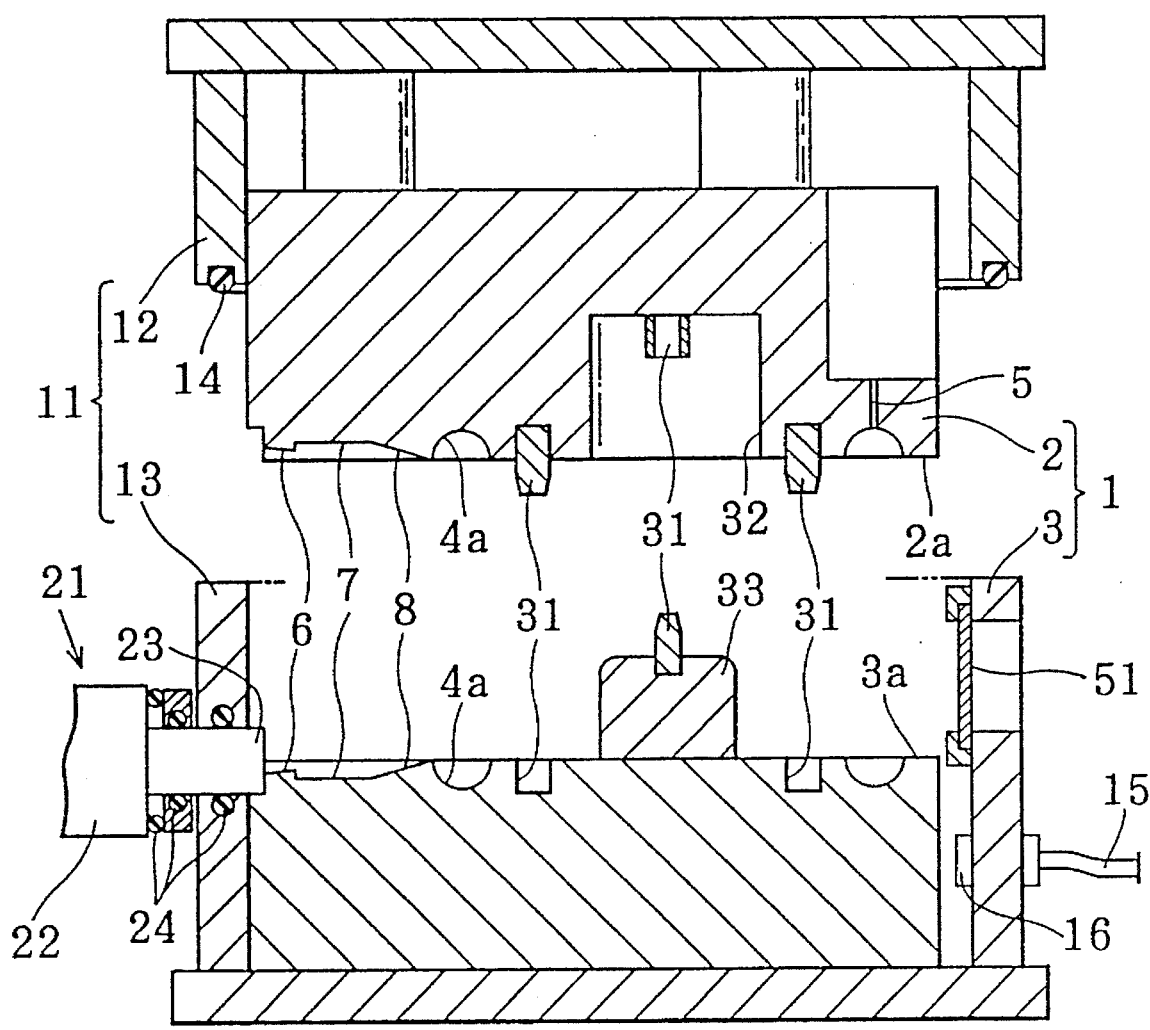
FIG. 1 is a sectional view showing a mold and a vacuum chamber (in their open positions) used for RIM of an ISF cover for a steering wheel in accordance with the present invention.
Figure 2:
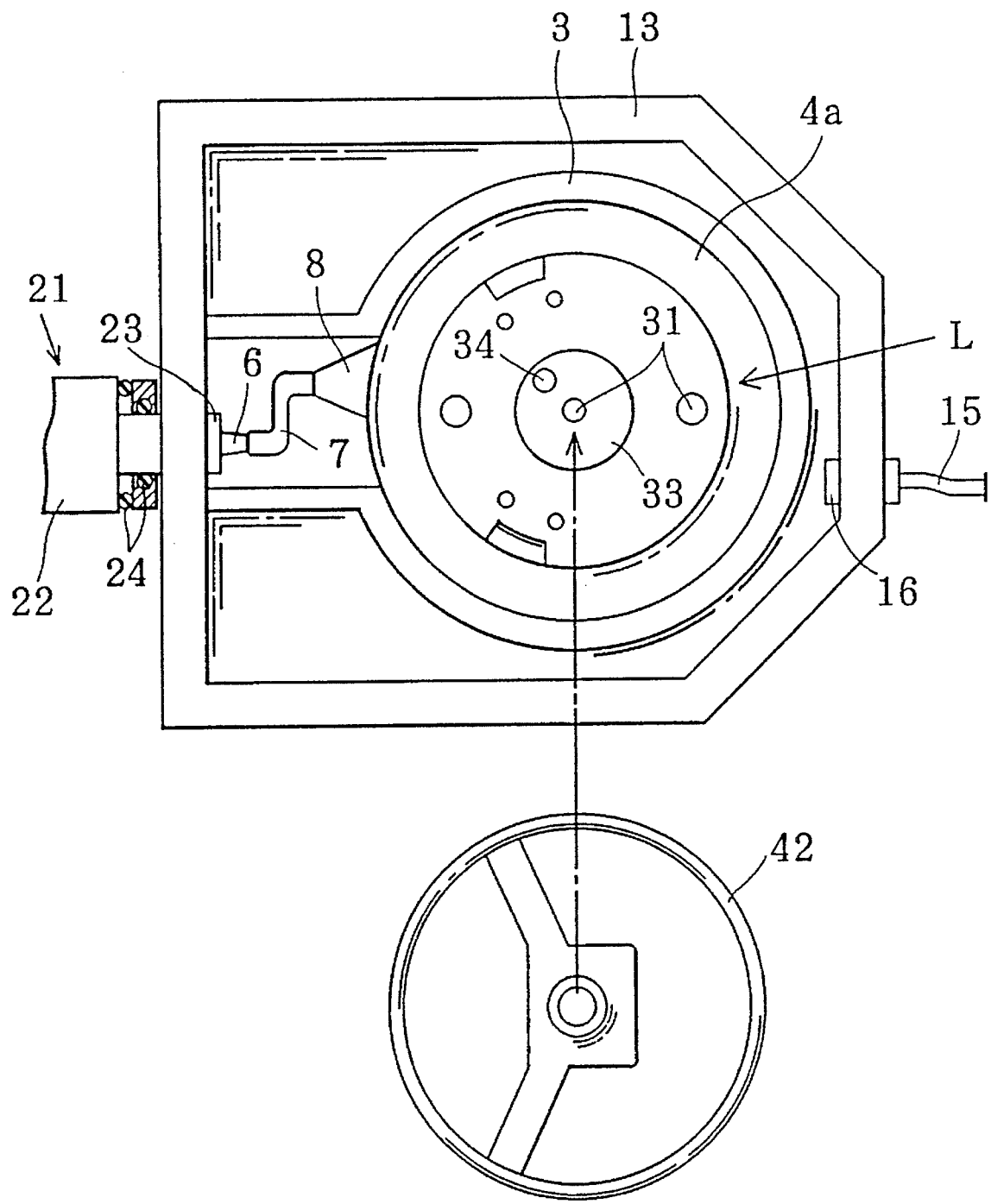
FIG. 2 is a top plan view showing a movable half of the mold and a lower casing of the vacuum chamber.
Figure 3:
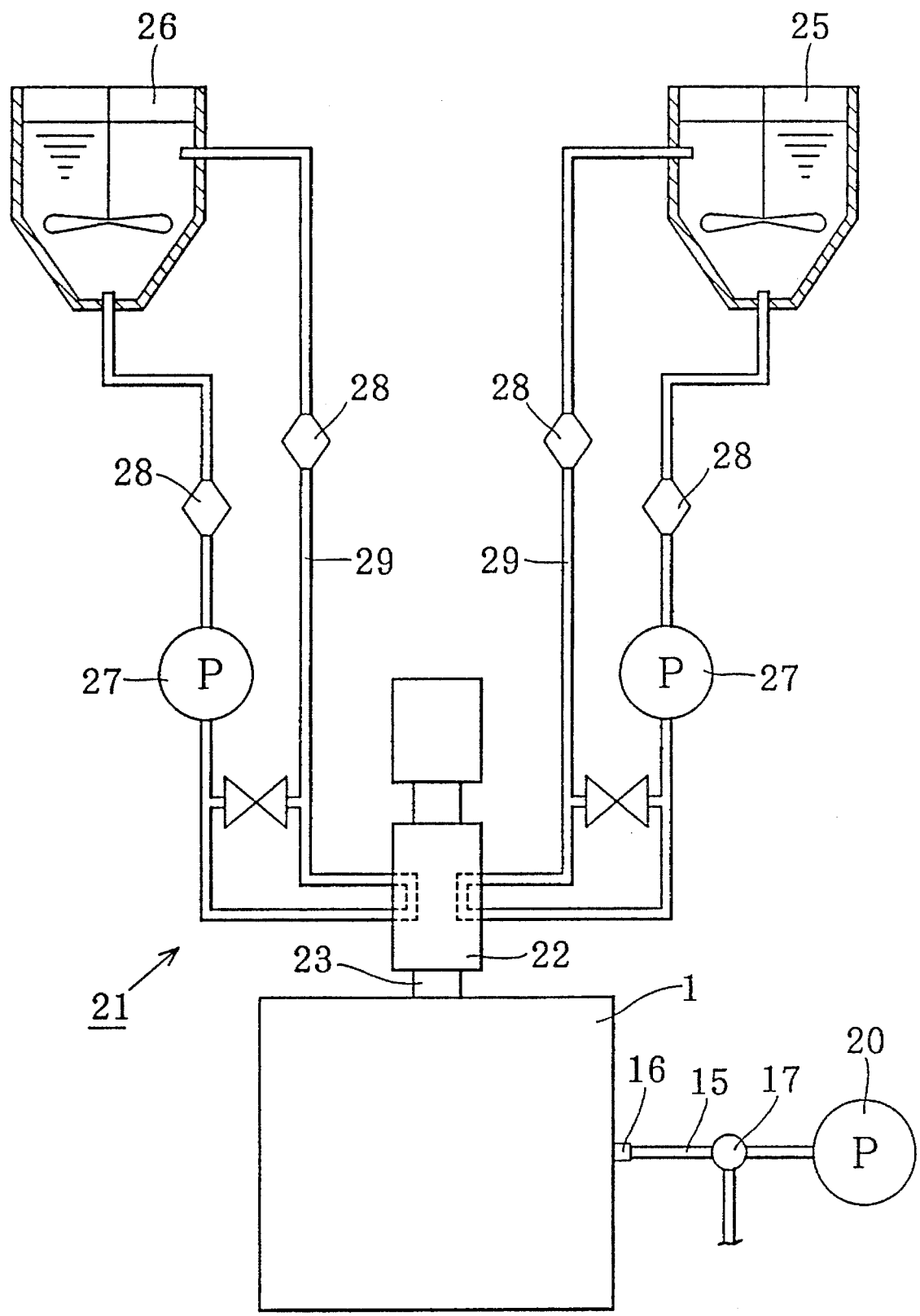
FIG. 3 is a schematic diagram showing an injection mechanism.

A first embodiment of the present invention in the production of an ISF cover for a steering wheel will be described with reference to FIGS. 1 to 8. As shown in FIGS. 1 to 3, this embodiment employs an apparatus which is constructed of a mold (1) (composed of 2 split molds), a vacuum chamber (11) arranged in the mold (1), a vacuum pump (20) to evacuate the vacuum chamber (11), and an injection mechanism (21) which is attached to the vacuum chamber (11) and is intended to inject a polyurethane material into the cavity (4) of the mold (1). A core (42) of a steering wheel (41) used in this embodiment is composed of a ring, spokes, and a boss at the center of the core. An ISF cover (43) is formed around the entire ring and a part of the spokes.

The mold (1) is made up of an upper stationary half (2) and a lower movable half (3). The two halves have grooves (4a), which face each other and form a circular cavity (4) when they are closed. At the center of the cross-section of the cavity (4) is placed the core (42) (including the entire ring and a part of the spoke). The PL (parting line) surface (2a) of the stationary half (2) and the PL surface (3a) of the movable half (3) are recessed to form a sprue (6), runner (7) and gate (8) through which the polyurethane material is injected into the cavity (4). The gate (8) opens on the outer periphery of the groove (4a) (at the left side in FIG. 2). Upon injection into the cavity (4) through the gate (8), the polyurethane material M flows in two directions in the cavity (4) and the two flows meet at position L (at the right side in FIG. 2) where the filling of the cavity is completed.

A vent hole (5) is formed at the final filling position L in the stationary half (2). The vent hole (5) is usually 1–10 mm in diameter. With a diameter smaller than 1 mm, the vent hole (5) does not perform venting as desired, in case the final filling position L of the polyurethane material fluctuates. With a diameter larger than 10 mm, the vent hole (5) leaves a noticeable vent mark which makes the molded product look poor. The vent hole (5) in this embodiment is a straight one, 15 mm long and 3 mm in diameter. When the mold is closed, there will be a clearance of about 0.03–0.06 mm (due to the limit of machining precision) between the PL surfaces (2a) and (3a) over the entire periphery of the cavity (4). This clearance functions as an air vent land for venting, further described below.

Inside each groove (4a) of the stationary half (2) and the movable half (3) are mating parts (31) to align the two halves, and a recess (32) and pedestal (33) to hold in position the boss of the core (42). The pedestal (33) is provided with an ejector pin (34) to release the steering wheel (41) as molded.

The mold (1) may be made of aluminum or electroformed for economy, according to known methods, provided that the mold will withstand a foaming pressure of approximately 50–500 kPa.

The vacuum chamber (11) is made up of an upper casing (12) to which the stationary half (2) is fixed and a lower casing (13) to which the movable half (3) is fixed. A mounting slot formed in the mating surface of the upper casing (12) is provided with a sealing O-ring (14), which makes the closed vacuum chamber (11) airtight. The lower casing (13) is provided with a suction port (16), which is connected to a vacuum pump (20) through a suction hose (15) and a leak valve (17), as shown in FIGS. 1 to 3. The vacuum chamber (11) is constructed such that it can accommodate the mold (1), forming a space K therein. The space K has a volume greater than the cavity (4).

Figure 5:
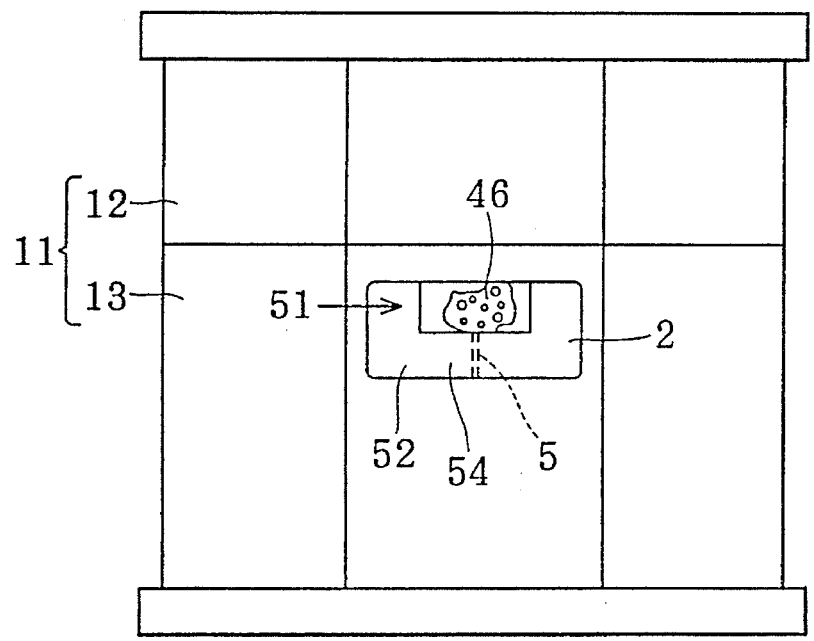
FIG. 5 is a side elevational view of FIG. 4 showing a sight glass.
Figure 6:
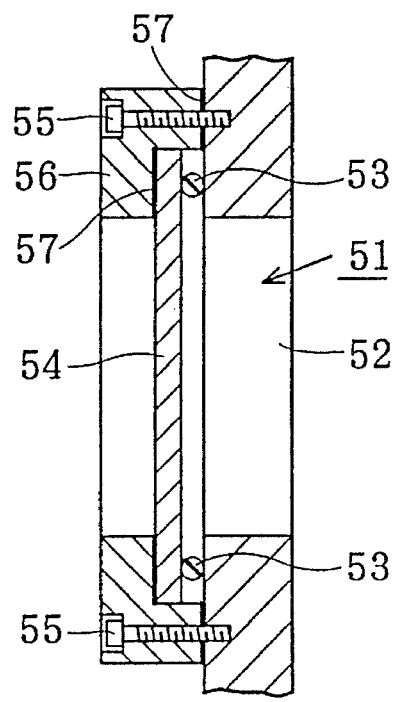
FIG. 6 is a partly enlarged sectional view of FIG. 4 showing the sight glass.

The lower casing (13) of the vacuum chamber (11) is provided with a sight glass (51) which makes the vicinity of the vent hole (5) visible from the outside of the lower casing (13), as shown in FIGS. 5 and 6. The sight glass (51) is made up of an opening (52) formed in the lower casing (13), a transparent plate (54) of glass or plastics which is pressed against the inside of the lower casing (13) with a seal ring (53) placed between them, so as to close the opening (52) from the inside, and a frame (56) which is fastened to the lower casing (13) by bolts (55) such that it presses the periphery of the transparent plate (54). It is desirable to place a gasket (57) between the frame (56) and the transparent plate (54), and between the frame (54) and the lower casing (13).

The stationary half (2) and the upper casing (12) are integrally constructed, and the movable half (3) and the lower casing (13) are also integrally constructed. The lower casing (13) is connected to a hydraulic cylinder ram (not shown), so that it is raised and lowered as the mold is closed and opened. At the time of mold closing, the lower casing (13) is raised until its periphery comes into contact with the periphery of the upper casing (12).

The injection mechanism (21), as shown in FIG. 3, is made up of a storage tank (25) for a polyol mixture, a storage tank (26) for an isocyanate component, a mixing head (22), and two circuits (29), each connecting the storage tank and the head through a high-pressure pump (27) and filters (28). This construction permits the mixing and circulation of the polyol mixture and the isocyanate component. The mixing head (22), as shown in FIG. 1, is provided with an injection nozzle (23) which can be connected to the sprue (6) of the mold (1) through 0-rings (24).

A polyurethane material used in this embodiment consists essentially of a polyol component and an isocyanate component, in the substantial absence of a foaming agent such as freon, and contains air bubbles introduced by air loading into the polyol component before it is mixed with the isocyanate component.

The sequence of operation in this embodiment is described below.

Figure 4:
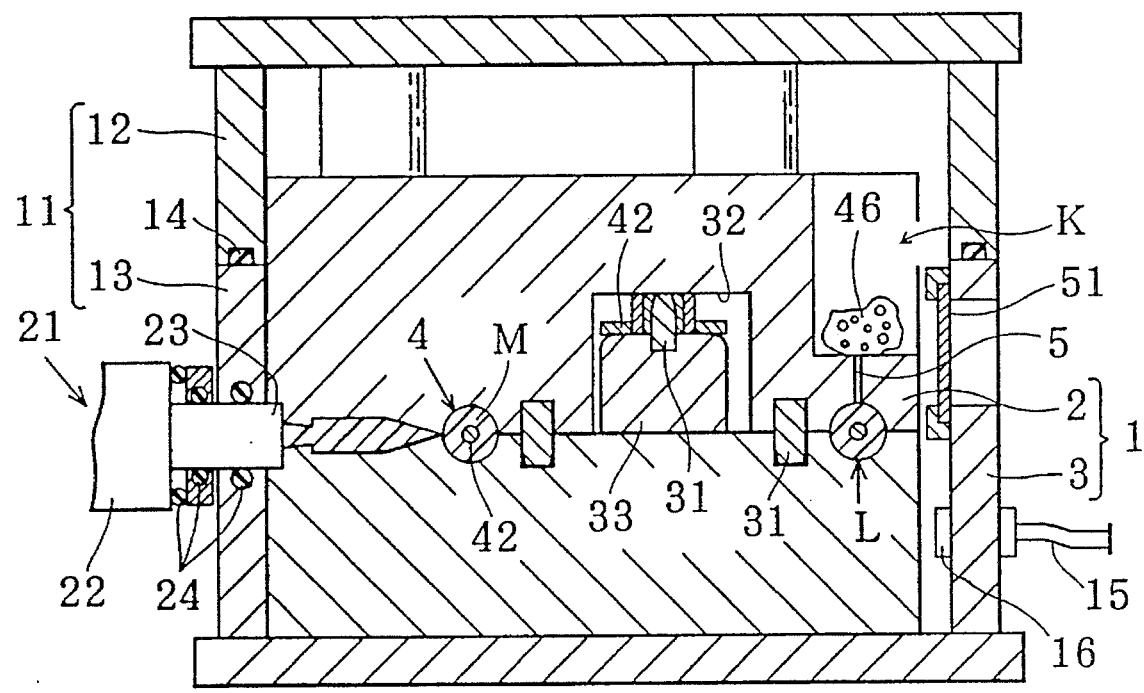
FIG. 4 is a sectional view showing the mold and the vacuum chamber as closed for RIM.

First, with the mold (1) open as shown in FIG. 1, the core (42) is set in the movable half (3) as shown in FIG. 2. The mold (1) is closed to form the cavity (4), and almost simultaneously, the vacuum chamber (11) is closed airtight, as shown in FIG. 4. According to this embodiment, the lower casing (13) is raised by a hydraulic cylinder ram (not shown)

until the sealing (14) comes into contact with the upper casing (12), so as to close the vacuum chamber (11) airtight, and simultaneously the stationary half (2) and the movable half (3) are closed. Incidentally, it is possible to close and open the mold (1) and the vacuum chamber (11) independently using separate hydraulic cylinders, so that it is also possible to close and open the mold (1) and the vacuum chamber (11) simultaneously or separately.

Then, the vacuum pump (20) is put in operation so as to evacuate the space K in the vacuum chamber (11) to a pressure of from above 50 to 700 Torr through the suction port (16). During this step, the cavity (4) is in communication with the space K in the vacuum chamber (11) through the sprue (6), the Clearance between the PL surfaces (2a) and (3a), and the vent hole (5). Therefore, the cavity (4) is also evacuated to almost the same vacuum degree as in the space K. With the evacuation continued, the polyurethane material M is injected for RIM into the cavity (4) through the injection nozzle (23), as shown in FIG. 4. The volume of injection is Usually ¼ to ¾ of the volume of the cavity (4). The injection time is 2–4 seconds. The space K, which is communicating with the cavity (4) through the clearance between the PL surfaces (2a) and (3a), functions as an accumulator. Therefore, the space K prevents the pressure in the cavity (4) from increasing as the polyurethane material M foams.

Figure 8:
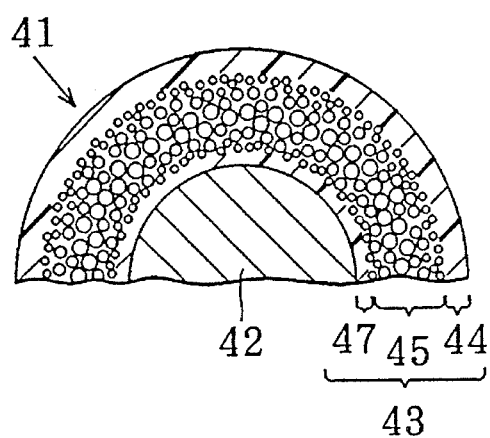
FIG. 8 is a partly enlarged sectional view of the ISF cover as shown in FIG. 7.
Figure 9:
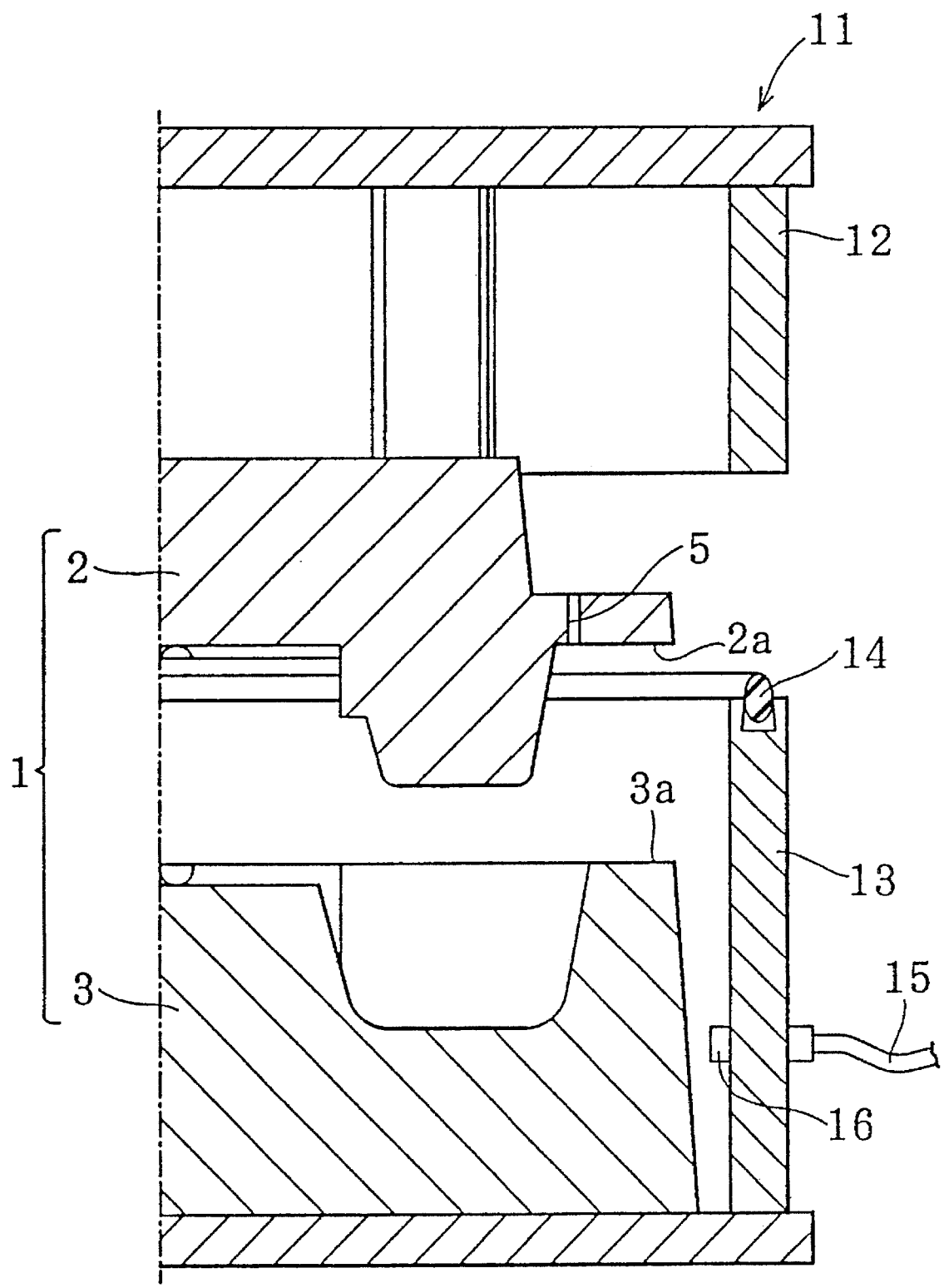
FIG. 9 is a sectional view showing a mold and a vacuum chamber (in their open positions) used for RIM of an ISF pad for a steering wheel in accordance with the present invention.
Figure 10:
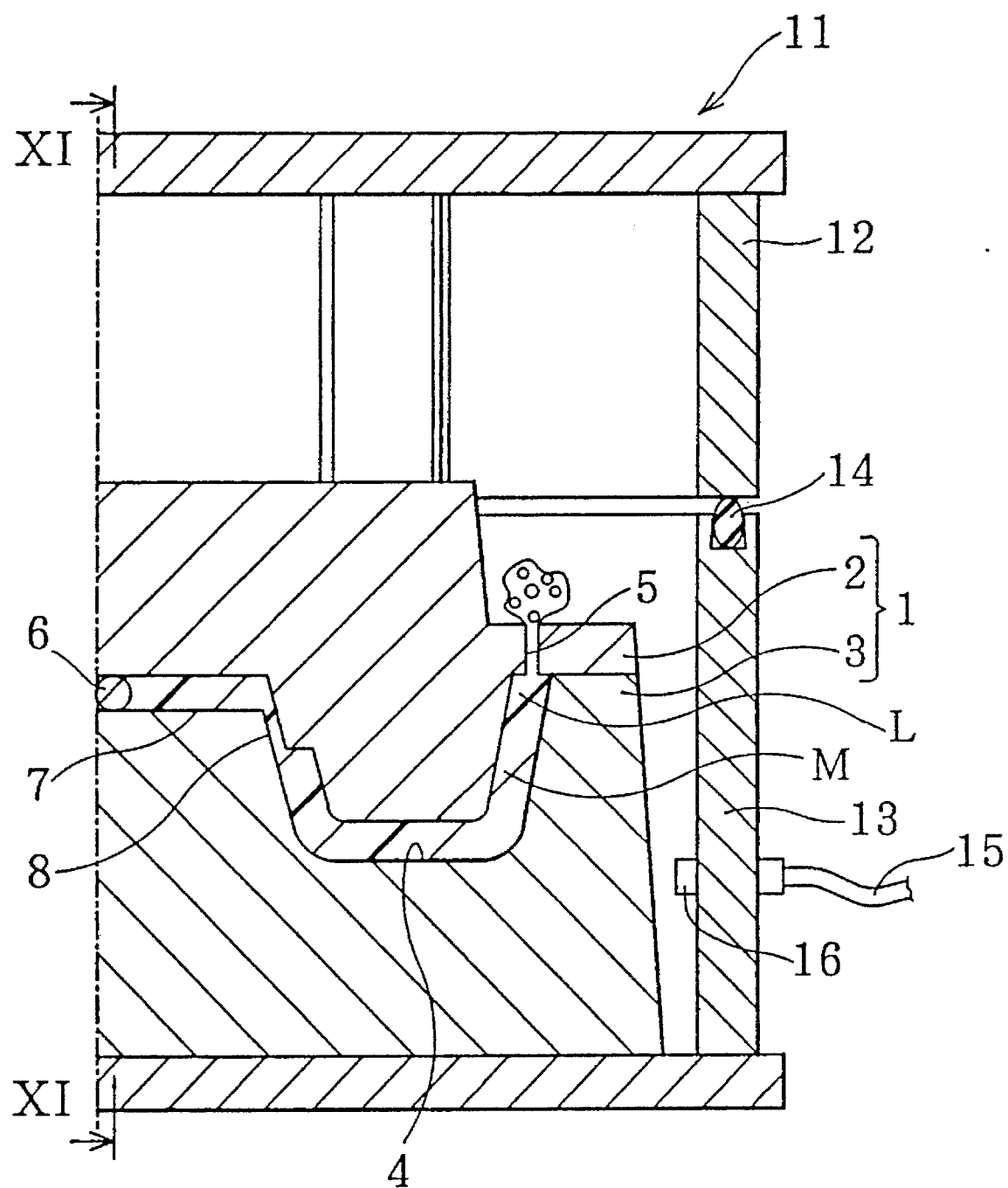
FIG. 10 is a sectional view showing the mold and the vacuum chamber as closed for RIM.
Figure 11:
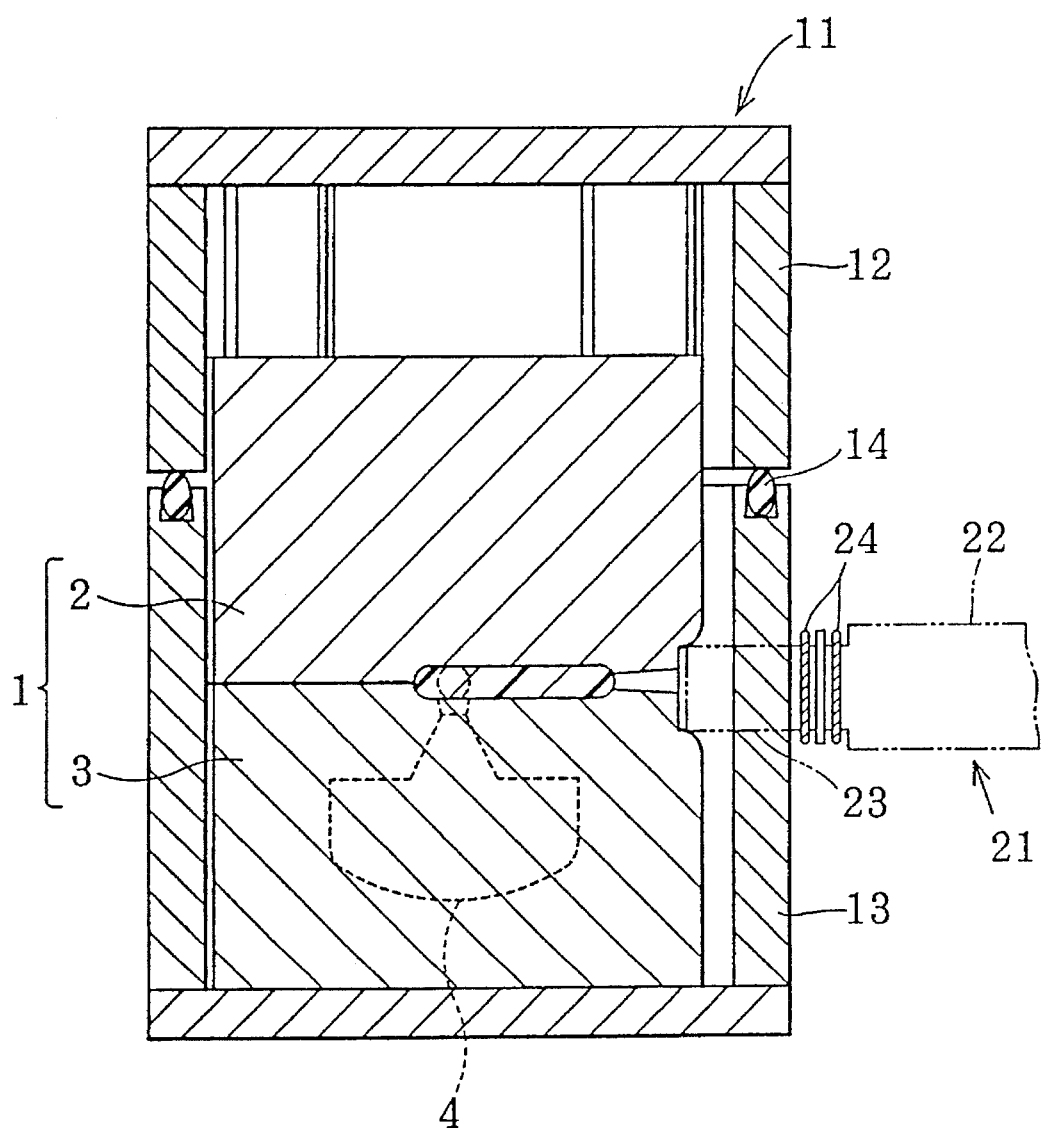
FIG. 11 is a sectional view taken along line XI—XI of FIG. 10.

At the center which is away from the wall surface of the cavity and the core (42), the injected polyurethane material M forms a core (45) having a high degree of foaming and low density (as shown in FIG. 8) owing to the above-described foaming. The polyurethane material M close to the wall surface of the cavity forms a solid integral skin (44) having a low degree of foaming such that virtually no bubble remains (as shown in FIG. 8) by the above-described debubbling. The polyurethane material M close to the core (42) also forms a solid adhesive layer (47) having a low degree of foaming (as shown in FIG. 8) by the debubbling described above. Usually, the adhesive layer (47) is slightly thinner than the skin (44).

As the polyurethane material M flows in the cavity, it seals the clearance between the PL surfaces (2a) and (3a). The reaction rate of the polyurethane material M is controlled such that as soon as the forward end of the flowing polyurethane material M reaches the final filling position L and slightly blows off from the vent hole (5), it cures to seal the vent hole (5).

According to this embodiment, one can observe what is happening in the vicinity of the vent hole (5) through the sight glass (51) from the outside of the vacuum chamber (11), as shown in FIG. 5. That is, one can see the polyurethane material M blowing off from the vent hole (5) or foaming, while keeping the vacuum chamber (11) closed.

An additional effect of evacuating the cavity (4) is that the polyurethane material M completely fills undercuts and branches in the cavity (4). Further, gases absorbed in the polyurethane material are debubbled to be discharged through the vent hole (5) and the clearance between the PL surfaces (2a) and (3a). This eliminates the necessity of overpacking the polyurethane material, unlike the conventional freon-based foaming, and thereby reduces the loss of material.

Figure 7:
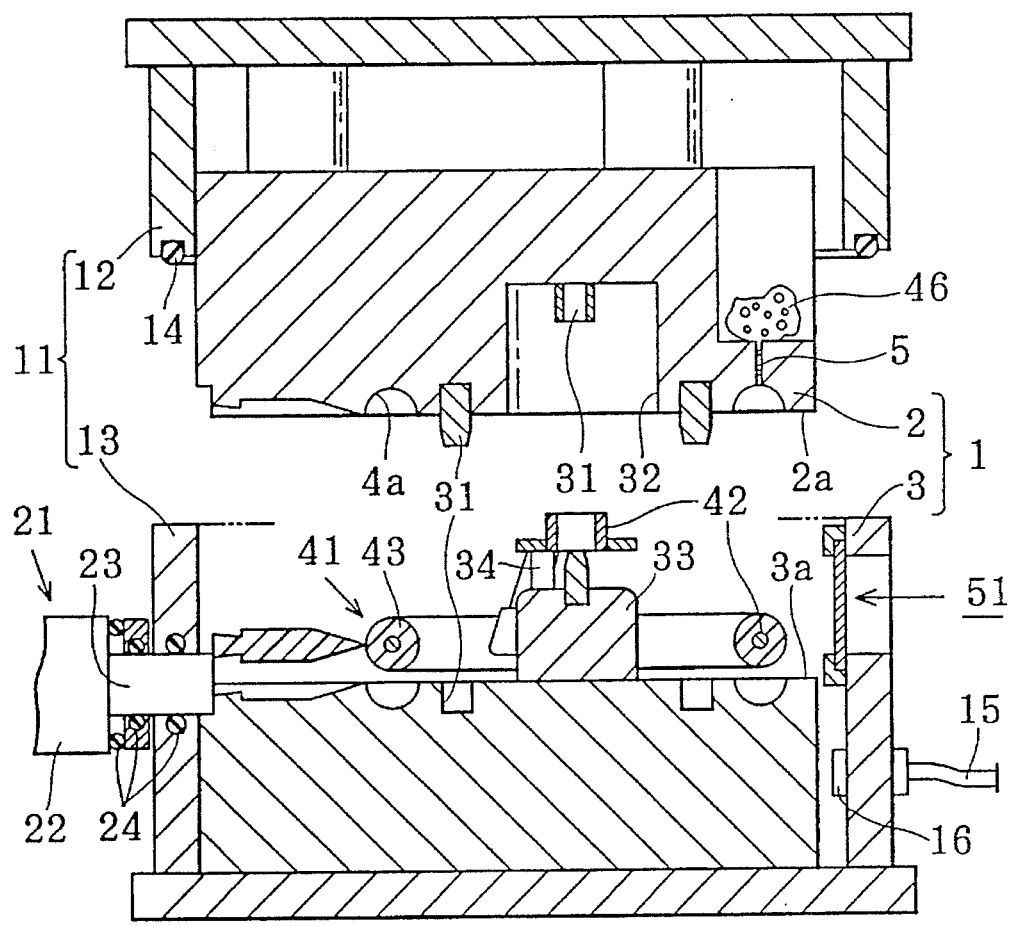
FIG. 7 is a sectional view of the mold and the vacuum chamber as opened, and an ISF cover as released from the mold.

When the polyurethane material M has cured in the cavity, the mold (1) is opened and simultaneously the vacuum chamber (11) is opened, as shown in FIG. 7. The mold opening action is interlocked with the ejector pin (34) which automatically releases the finished steering wheel (41) having the ISF cover (43).

According to the process and material of this embodiment, the following effects, which are particularly suitable for molding the ISF cover (43) for the steering wheel (41), can be obtained. The polyurethane material M is subject to turbulence owing to the long ring of the core (42), and turbulence normally causes defects such as pinholes, voids and short shot. In this embodiment, however, the polyurethane material M is less liable to turbulence because the cavity (4) is evacuated. This permits one to select the position of the gate (8) more freely. In this embodiment, the gate (8) is on the outer periphery of the ring and there is only one vent hole (5). The injected polyurethane material M normally flows in two directions and the two flows meet at the final fill position L, as described above. The flow in this manner used to cause a weld line at the meeting point and to entrap gases which lead to defects such as pinholes, voids and short shot. In this embodiment, however, this problem is solved because the cavity is evacuated and the polyurethane material at the meeting point blows off from the vent hole (5).

In this embodiment, the ISF cover (43) firmly adheres to the ring of the core (42), because the solid adhesive layer (47) containing very few minute bubbles is formed on the surface of the core (42).

Each polyurethane material of the composition shown in the following Table 1 was prepared for each of Examples 1 and 2 falling within the scope of the process embodying the present invention, and was employed to ascertain the advantages thereof over the Comparative Example not falling within its scope. The polyether polyol employed was a mixture consisting of equal amounts of a bifunctional polyether polyol having a molecular weight of 4000 and a trifunctional polyether polyol having a molecular weight of 6000. Triethylenediamine was a catalyst which was conventionally employed for promoting both foaming and curing, and usually added in the amount of 0.6 to 1.0 parts by weight for 100 parts by weight of the polyol component. In each of the Examples embodying the present invention, air loading was performed to introduced air bubbles into the polyurethane material, so that the material employed in Example 1 might contain 25% by volume of air bubbles; and the material in Example 2 10% by volume. The material employed in the Comparative Example contained about 0.5% by volume of air bubbles which had naturally been entrained therein. Each polyurethane material was injected into the cavity (4) evacuated to the vacuum degree as indicated in Table 1 to foam and thereby form the ISF cover (43) for the steering wheel.

TABLE 1

| Composition of polyurethane material and vacuum degree of cavity | | | |
|---|---|---|---|
| Components | Example 1 (parts by weight) | Example 2 (parts by weight) | Comparative Example (parts by weight) |
| Polyol mixture | | | |
| Polyether polyol (ave. M.W. = 5000) | 100 | 100 | 100 |
| Diethylene glycol (M.W. = 106) | 18 | 18 | 18 |
| Triethylenediamine | 0.7 | 0.7 | 0.7 |
| Pigment | 6 | 6 | 6 |
| Antioxidant | 1 | 1 | 1 |
| Silicone (foam stabilizer) | 1 | 1 | 1 |
| Isocyanate | 56.9 | 56.9 | 56.9 |

TABLE 1-continued

Composition of polyurethane material and vacuum degree of cavity

| Components | Example 1 (parts by weight) | Example 2 (parts by weight) | Comparative Example (parts by weight) |
|---|---|---|---|
| MDI prepolymer (NCO 28%) | | | |
| Amount of air bubbles introduced by air loading (% by volume) | 25 | 10 | 0.5 |
| Vacuum degree of cavity (Torr) | 400 | 100 | 400 |
| Density of core (g/cm$^3$) | 0.5 | 0.6 | SS |

The core (45) of each ISF cover, as molded, was examined for density. In each of Examples 1 and 2, the core (45) showed low density with a high degree of foaming, as the polyurethane material had been fully foamed and filled the cavity, while in the Comparative Example, the material had not fully been foamed, but resulted in short shot, and the core was not examined for density, as is obvious from Table 1. Each of the integral skins (44) as molded according to Examples 1 and 2 had very few minute bubbles on its surface, and had a surface appearance and feel which are as good as, or superior to those of a product made using freon as a foaming agent.

Reference is now made to FIGS. 9 to 12 showing a second embodiment of the present invention which is employed for molding an ISF pad for a steering wheel. The molding apparatus which is employed for carrying out this embodiment differs from the apparatus employed for the first embodiment in that a cavity (4) for molding an ISF pad is defined between a recess in a movable half (3) and a projection on a stationary half (2), and that a lower casing (13) is provided with a sealing (14) adapted to contact its upper portion. In any other respect, the two apparatuses are substantially identical in construction, and like numerals are, therefore, used to indicate like parts throughout all of the drawings showing the two apparatuses, so that no repeated description is provided.

Figure 12:
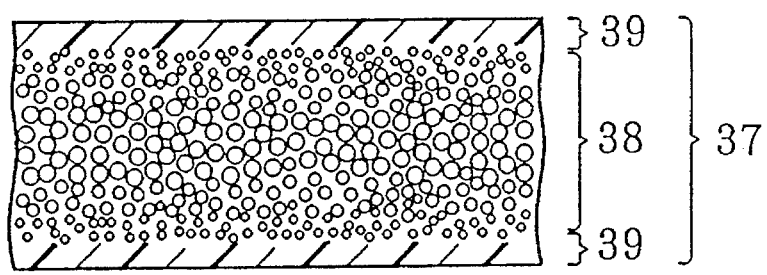
FIG. 12 is a partly enlarged sectional view of an ISF pad as molded.

A polyurethane material M, as in the first embodiment, consists essentially of a polyol component and an isocyanate component, yet substantially free of a foaming agent, and contains air bubbles introduced by air loading into the polyol component before it is mixed with the isocyanate component. The polyurethane material M is injected for RIM into the cavity (4) evacuated to a pressure of from above 50 to 700 Torr. At the center which is away from the wall surface of the cavity, the injected polyurethane material M forms a core (38) having an outstandingly high degree of foaming (as shown in FIG. 12), while the polyurethane material M close to the wall surface forms a solid integral skin (39) having a low degree of foaming such that virtually no bubble remains (as shown in FIG. 12). Thus, an ISF pad (37), as molded, has a superior appearance and better physical properties.

The second embodiment provides the same advantages, as the above described first embodiment.

Figure 13:
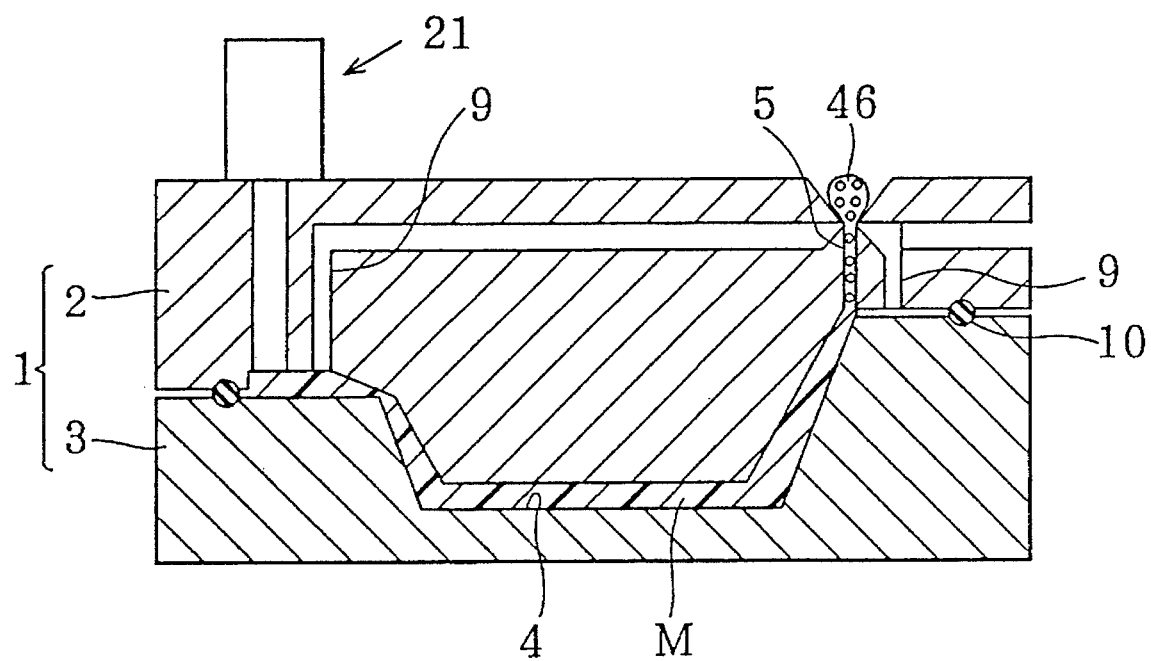
FIG. 13 is a sectional view showing another example of the mold.

It is understood that various changes and modifications may be made in the invention as, for example, those which follows without departing from the spirit and scope thereof. Although the apparatus in the embodiments is constructed of the mold (1) and the vacuum chamber (11) which are separate from each other, the mold may be of double-wall structure, with the outer wall functioning as the vacuum chamber (11), so that the space is formed in the mold integrally with the mold. It is possible to form a groove (9) in all or part of the periphery of the cavity (4) of the mold (1), as shown in FIG. 13, so that the cavity (4) is evacuated through this groove (9). In this case, the groove (9) functions as the space. This groove (9) may be formed in either or both of the stationary half (2) and the movable half (3). It is desirable that the groove (9) be isolated from the atmosphere by a sealing (10). Although the mold used in the above-mentioned embodiments has a vent hole (5), it is possible to replace the mold by one of another type having a porous core in place of the vent hole, said porous core facing the cavity and being positioned at a place where the injected polyurethane material finally reaches. The porous core permits the injected polyurethane material to be degassed before molding is completed. The mold is not limited to that of metal; but it may be replaced by a ceramic mold or resin mold which withstands the foaming pressure.

What is claimed is:

1. A process for molding a semi-rigid integral skin foam which comprises an integral skin having a low degree of foaming and a core having a high degree of foaming, comprising the steps of:

evacuating a mold cavity to a pressure of from above 50 to 700 Torr;

injecting into said mold cavity a polyurethane precursor material consisting essentially of a polyol component and an isocyanate component, and containing air bubbles introduced therein by air loading, said precursor material being substantially free of a foaming agent;

allowing said precursor material to react, while foaming said precursor material so as to flow and fill said mold cavity and thereby form said integral skin foam;

such that a core having a high degree of foaming is formed by expansion of said air bubbles absorbed in said precursor material, and an integral skin having a low degree of foaming is formed at a surface of said precursor material by debubbling said air bubbles.

2. A process as set forth in claim 1, wherein said air bubbles are introduced into said polyol component before it is mixed with said isocyanate component.

3. A process as set forth in claim 1, wherein said material contains 1 to 50% by volume of said air bubbles.

* * * * *